United States Patent [19]

Fujita

[11] Patent Number: 4,872,170
[45] Date of Patent: * Oct. 3, 1989

[54] ERROR DETECTION CIRCUIT

[75] Inventor: Tadao Fujita, Kanagawa, Japan

[73] Assignee: Sony Corporation, Tokyo, Japan

[ * ] Notice: The portion of the term of this patent subsequent to Jun. 3, 2004 has been disclaimed.

[21] Appl. No.: 883,527

[22] Filed: Jul. 9, 1986

[30] Foreign Application Priority Data

Jul. 9, 1985 [JP] Japan .................................. 60-150696

[51] Int. Cl.⁴ .......................... G06F 11/00; H04N 5/44
[52] U.S. Cl. ...................................... 371/30; 358/314; 358/336; 360/38.1
[58] Field of Search ..................... 371/30, 31; 358/336, 358/314; 360/38.1, 53

[56] References Cited

U.S. PATENT DOCUMENTS 3,909,518  9/1975  Baker ................................... 358/107
3,925,605  12/1975  Rennick ............................... 358/336
4,356,507  10/1982  Goldberg et al. .................... 358/13

FOREIGN PATENT DOCUMENTS 0055540  7/1982  European Pat. Off. .
0102782  4/1984  European Pat. Off. .
1596219  8/1981  United Kingdom .
2086691  5/1982  United Kingdom .

Primary Examiner—Charles E. Atkinson
Attorney, Agent, or Firm—Lewis H. Eslinger; Jay H. Maioli

[57] ABSTRACT

An input receives a digital video signal that when free of error lies within a given frequency band and when not free of error contains components lying outside the frequency band. Such components have an amplitude versus frequency distribution that is a function of the number and location of errors in the digital video signal. A detector is responsive to the input for detecting components of the digital video signal lying outside the frequency band, and a pattern recognition circuit responsive to the detector produces an output indicative of the number and location of the errors.

11 Claims, 10 Drawing Sheets

FIG. IIC

| | | | | | | | | | | | | | | |
|---|---|---|---|---|---|---|---|---|---|---|---|---|---|---|
| (a) | | | 1 | | 1 | 1 | 1 | 1 | | | 1 | | | |
| (b) | | 0 | | 0 | 0 | 0 | 0 | | | 0 | | | | |
| (c) | | 0 | | 0 | 0 | 0 | 0 | | | 0 | | | | |
| (d) | | 0 | | 0 | 0 | 0 | 0 | | | 0 | | | | |
| (e) | | 0 | | 0 | 0 | 0 | 0 | | | 0 | | | | |
| (f) | | | 1 | 1 | 0 | 1 | 1 | 1 | 0 | 1 | 1 | | 1 | |
| (g) | | 1 | 1 | 1 | 1 | 0 | 0 | 0 | 1 | 1 | 1 | | 1 | |
| (h) | | 0 | 0 | 0 | 1 | 1 | 1 | 1 | 1 | 0 | 0 | 0 | 0 | |
| (i) | | 0 | 0 | 0 | 1 | 0 | 0 | 0 | 1 | 0 | 0 | 0 | 0 | |
| (j) | | 0 | 0 | 0 | 1 | 0 | 0 | 0 | 1 | 0 | 0 | 0 | 0 | |
| (k) | | 0 | 1 | 1 | 0 | 1 | 1 | 1 | 0 | 1 | 1 | 1 | 1 | |
| (ℓ) | | 0 | 0 | 0 | 1 | 0 | 0 | 0 | 1 | 0 | 0 | 0 | 0 | |
| (m) | | 0 | 0 | 0 | 0 | 1 | 0 | 0 | 0 | 1 | 0 | 0 | 0 | |
| (n) | | 0 | 0 | 0 | 0 | 1 | 0 | 0 | 0 | 1 | 0 | 0 | 0 | 0 |
| (o) | | 0 | 0 | 0 | 0 | 0 | 1 | 0 | 0 | 0 | 1 | 0 | 0 | 0 |
| (p) | | 0 | 0 | 0 | 0 | 0 | 1 | 0 | 0 | 0 | 1 | 0 | 0 | 0 |
| P1 | 0 | 0 | 0 | 0 | 1 | 0 | 0 | 0 | 1 | 0 | 0 | 0 | 0 | 0 |
| P2 | | 0 | 0 | 0 | 0 | 1 | 0 | 0 | 0 | 0 | 0 | | 0 | |

ERROR DETECTION CIRCUIT

BACKGROUND OF THE INVENTION

1. Field of the Invention

This invention relates to error detection circuits and, more particularly, to a novel and highly-effective error detection circuit that requires no error correcting code and is suitable for use with digital signal reproducing apparatus, for example a digital video tape player.

2. Description of the Prior Art

In a digital video tape recorder (VTR) for recording and/or reproducing a composite color video signal as a digital signal, erroneous data occurring in a normal playback mode can be detected by means of error detecting or correcting codes. In practice, the error is corrected when error correction is possible by means of the error correcting code and is concealed by interpolation using mean values or the like when the error is not correctable.

In the variable-speed playback mode, however, the rotary head scans at an angle across a plurality of tracks because of the changes in the tape speed and therefore it becomes impossible to obtain continuous accurate data. Thus, error correction by means of an error correcting code is considered generally difficult. Although error correction codes of small code length can be used so that error can be corrected also during the variable-speed playback, there arises the problem that the correct video data is not utilized when the redundant code as its error correcting code is incorrect, since the interleave length of the correcting code is short. Further, since the error rate increases in the variable-speed playback mode, there occurs another problem that proper correction cannot be made when error correction is performed based on the detected result of error correcting codes

OBJECTS AND SUMMARY OF THE INVENTION

An object of the present invention is to remedy the problems noted above and in particular to provide an error detection circuit that detects errors without employing error detection or correction codes.

Another object of the present invention is to provide an error detection circuit capable of correctly detecting the position of erroneous data.

It is a further object of the present invention to provide an error detection circuit suitable for use with a digital VTR in a variable speed playback mode.

According to one aspect of the invention, the foregoing and other objects are attained by the provision of error detection circuitry comprising input means for receiving a digital video signal that when free of error is within a given frequency band and when not free of error contains components lying outside the frequency band, the components having an amplitude versus frequency distribution that is a function of the number and location of errors in the digital video signal; detection means responsive to the input means for detecting components of the digital video signal lying outside the frequency band; and pattern recognition means responsive to the detection means for producing an output indicative of the number and location of the errors.

BRIEF DESCRIPTION OF THE DRAWINGS

A better understanding of the objects, features and advantages of the invention can be gained from a consideration of the following detailed description of the preferred embodiment thereof, in conjunction with the appended drawings, wherein a given reference character always designates the same element or part, and wherein:

FIGS. 11A, 11B and 11C are diagrams corresponding respectively to FIGS. 7A, 7B and 7C and showing pulse sequences at designated points in the block diagram of FIG. 10.

DESCRIPTION OF THE PREFERRED EMBODIMENT

A preferred embodiment of the present invention will be described in the following with reference to the accompanying drawings.

Figure 1:
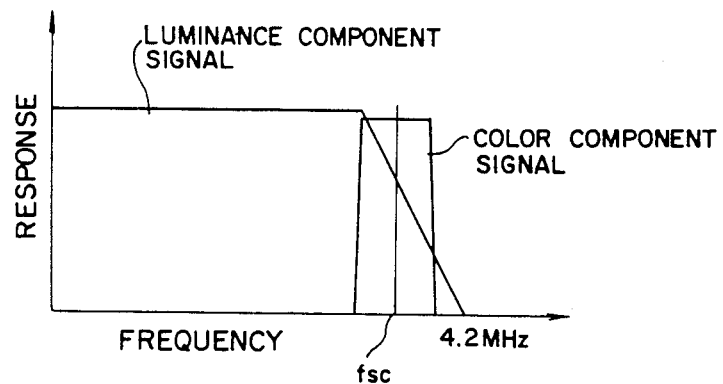
FIG. 1 is a spectrum diagram used for explaining an embodiment of the invention.

In a digital VTR, when a digitized composite color video signal is recorded on a magnetic tape with a rotary magnetic head, there is performed a shuffling or interleaving process. Since a burst error is dispersed by a de-shuffling or de-interleaving process during reproduction, error data do not appear in succession but appear in the form of random errors of one sample or two samples in the reproduced digital data. The maximum frequency of the video signal is limited to, for example, 4.2 MHz in the NTSC system as shown in FIG. 1. If one of such random erroneous data as mentioned above is contained in a reproduced signal, a signal component having a frequency outside the frequency band of the video signal is in the reproduced signal. Therefore, through detection of the signal component lying outside the frequency band of the video signal, the erroneous data can be detected.

Figure 2:
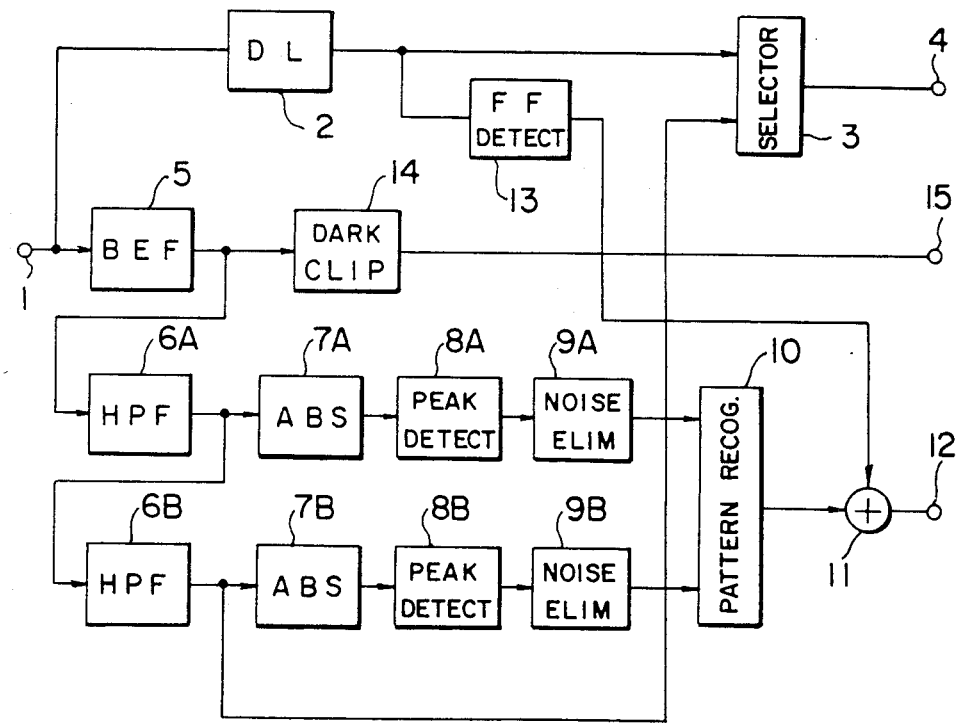
FIG. 2 is a block diagram of a preferred embodiment of the invention.

In FIG. 2, an input terminal 1 is supplied with a digital composite color video signal of, for example, eight bits which has been reproduced by a rotary magnetic head (not shown) in a digital VTR. The composite color video signal is digitized at the sampling rate of 4 times $f_{sc}$ ($f_{sc}$ is the color subcarrier frequency). The digital video signal from the input terminal 1 is taken out from an output terminal 4 by way of a delay circuit 2 and a selector 3 and delivered to the succeeding stage (not shown).

When the digital composite color video signal is applied from the input 1 to the band eliminating filter 5 eliminating the component of the color subcarrier frequency $f_{sc}$ of 3.58 MHz, for example, the color subcarrier frequency component which has large power is first eliminated. An output of the band eliminating filter 5 is supplied to the high pass filter 6A for allowing the component lying outside the frequency band of the video signal, the component exceeding 4.2 MHz, for example, to pass therethrough. The output of the high pass filter 6A is applied to the high pass filter 6B, whereby the signal component within the frequency band of the video signal is removed.

Figure 3:
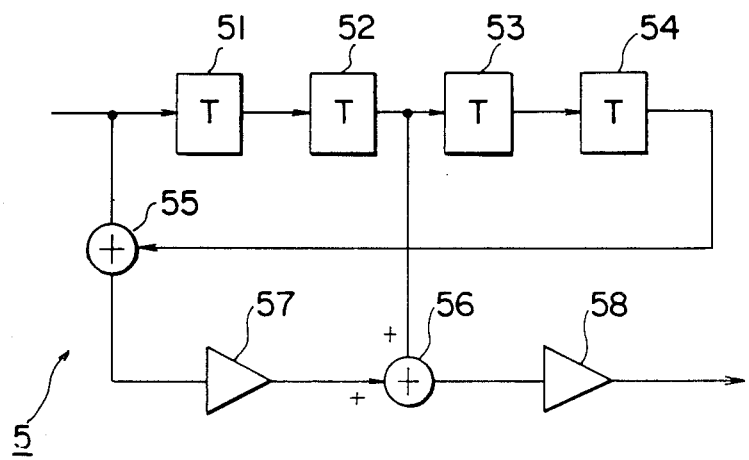
FIG. 3 is a block diagram of a band-eliminating filter used in the embodiment of FIG. 2.

As the band eliminating filter 5, a digital filter as shown in FIG. 3, for example, is employed, which is formed of one-sample delay circuits 51, 52, 53 and 54, adder circuits 55 and 56, and ½ multiplier circuits 57 and 58. The transfer function H(z) of the digital filter is given by:

$$H(z)=(1+2z^{-2}+z^{-4})/4$$

Where z represents the well-known transform for sampled data (akin to the Laplace transform for continuous data).

Figure 4:
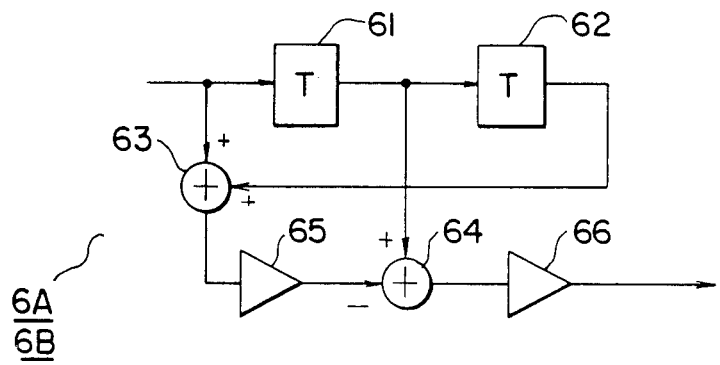
FIG. 4 is a block diagram of a high-pass filter used in the embodiment of FIG. 2.

As the high pass filters 6A and 6B, digital filters as indicated in FIG. 4, for example, are respectively used, each of which comprises one-sample delay circuits 61 and 62, adder circuits 63 and 64, and ½ multiplier circuits 65 and 66. The transfer function H(z) of the digital filter is given by:

$$H(z)=(-1+2z^{-1}-z^{-2})/4$$

Since the output of the high pass filter 6A is supplied to the high pass filter 6B, a digital filter which is composed of the high pass filters 6A and 6B has a transfer function H(z) with a steep characteristic as expressed by:

$$H(z)=(-1+2z^{-1}-z^{-2})(-1+2z^{-1}-z^{31\,2})/16$$

Only the signal component lying outside the frequency band of the video signal is derived from the high pass filter 6B, and whether or not some error data is contained in the video signal is detected according to the output from the high pass filter 6B. If erroneous data is contained in the video signal, an output is produced by the high pass filter 6B. And if no erroneous data is contained in the video signal, no output is produced by the high pass filter 6B.

Figure 5:
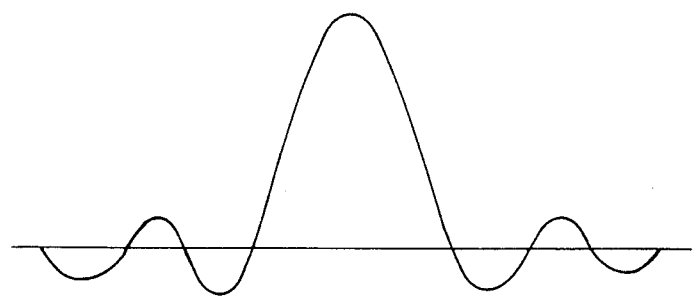
FIG. 5 is a waveform diagram used for explaining an error detection circuit constructed in accordance with the invention.

However, it is difficult to determine the position of the erroneous data by using only the output of the high pass filter 6B. More particularly, when erroneous data is detected, a filter output as shown in FIG. 5 is produced as an output by the digital filter. When the filter has a steep characteristic, much ringing results, and peak values of the filter output appear in a plurality of positions. Further, if two samples or more or erroneous data are included in the data taken in the filter, the peak values of the filter output do not always correspond to the positions of the erroneous data.

In order to determine the position of the erroneous data from the filter output, there are provided an absolute value circuit 7A, a peak detection circuit 8A, and a noise reduction or removal circuit 9A responsive to the output of the high-pass filter 6A, as well as an absolute value circuit 7B, a peak detection circuit 8B, and a noise reduction or removal circuit 9B responsive to the output of the high-pass filter 6B. Since the filter characteristic of the high-pass filter 6A is gradual as compared with the filter characteristic of the combination of the high-pass filters 6A and 6B, there is produced not so much ringing in the former.

Figure 6:
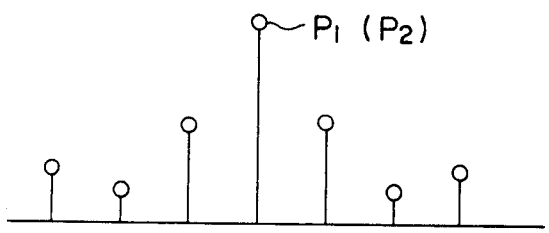
FIG. 6 is a diagram used for explaining peak detection in accordance with the invention.

The outputs of the high-pass filters 6A and 6B are converted through the absolute value circuit 7A and 7B, respectively, into data of absolute values as indicated in FIG. 6, and supplied to peak detection circuits 8A and 8B, respectively, into data of absolute values as indicated in FIG. 6, and supplied to peak detection circuits 8A and 8B, respectively. In the peak detection circuits 8A and 8B, peak values $P_1$ and $P_2$ of the outputs of the high-pass filters 6A and 6B passed through the absolute value circuits 7A and 7B are obtained, respectively. These outputs of the peak detection circuits 8A and 8B are supplied through the noise removal circuits 9A and 9B, respectively, to the pattern recognition circuit 10. There are established threshold values in the noise removal circuit 6A and 6B, whereby low level peak values $P_1$ and $P_2$ in the peak values $P_1$ and $P_2$ detected by the peak detection circuits 8A and 8B which are not necessary in pattern recognition are removed by the noise removal circuits 9A and 9B.

Figure 7A:
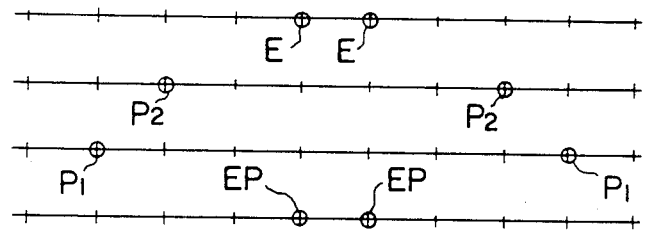
FIGS. 7A, 7B and 7C are diagrams used for explaining error detection in accordance with the invention.
Figure 7B:
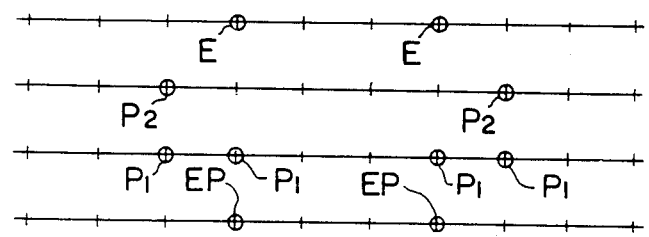
Figure 7C:
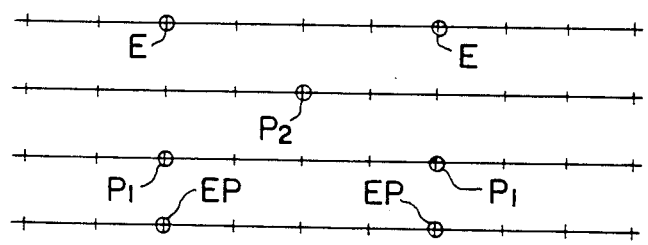

The error position is found in the pattern recognition circuit 10 based on the peak values $P_1$ and $P_2$ supplied thereto through the noise removal circuits 9A and 9B. In the case where the erroneous data E consists of one sample, the peak values $P_1$ and $P_2$ correspond to the position of the erroneous data. In the case where the erroneous data consists of two samples, the peak values $P_1$ supplied by the noise removal circuit 9A and the peak values $P_2$ supplied by the noise removal circuit 9B appear in specific patterns, as shown for example in FIGS. 7A to FIG. 7C, because of dispersion of the erroneous data E. The pattern recognition circuit 10 determines to what pattern the pattern of the peak values $P_1$ and $P_2$ supplied thereto through the noise removal circuits 9A and 9B belongs. In this way the positions of the erroneous data are determined. The error pulses EP as shown in FIGS. 7A to FIG. 7C are generated by the pattern recognition circuit 10 in accordance with the positions of the erroneous data, and these error pulses are supplied to an adder circuit 11. The output of the adder circuit 11 is supplied through an error pulse output terminal 12. Although not shown, there is provided an error correction circuit in the succeeding stage, wherein an error correcting process is performed based upon the mentioned error pulses EP.

An FF data detection circuit 13 (FIG. 2) detects "FF" data of hexadecimal number. When a digital color video signal input from the input terminal 1 is supplied through the delay circuit 2 to the FF detection circuit 13, if hexadecimal "FF" data which could not be the sample data of the video signal is detected, an error pulse is generated by the FF detection circuit 13, and this error pulse is supplied to the adder circuit 11.

The output of the band eliminating filter 5 is supplied to a dark clip detection circuit 14 to be compared with the data for the pedestal level. In the case where some data below the pedestal level is detected by the dark clip detection circuit 14, the detected signal generated at the output terminal 15 is applied to a succeeding dark clip circuit (not shown) and converted into the data of the pedestal level.

The selector 3 is provided there so that the component lying outside the band of the video signal can be supplied as an output for testing. The output of the delay circuit 2 and the output of the high-pass filter 6B are applied to the selector 3 and selectively taken out from the output terminal 4.

The patterns of the pulses generated by the peak detectors 8A, 8B are dependent on the characteristics of the filter for removing the color video signal band. There are many patterns other than those indicated in FIG. 7, depending on the filter characteristics.

In the case where a pattern which is not established therein is detected, the pattern detection circuit 10 detects whether or not a peak value $P_2$ which has passed through the noise removal circuit 9B is present, for example, within two samples before and after the peak value $P_1$ which has passed through the noise removal circuit 9A, and if the peak value $P_2$ is detected there, then determines this data to be the erroneous data. The detection of $P_2$ may be made within one sample before and after the peak value $P_1$, or it may be adapted to be switchable according to circumstances.

Absolute value, peak detection and noise reduction circuits are conventional per se and well understood by those skilled in the art. They therefore need not be disclosed in detail herein. However, FIGS. 8A and 8B respectively show details of these circuits which are suitable for use as the absolute value circuit 7A, peak detection circuit 8A and noise reduction circuit 9A (all shown in FIG. 8A) and as the absolute value circuit 7B, peak detection circuit 8B and noise reduction circuit 9B (all shown in FIG. 8B).

Figure 8A:
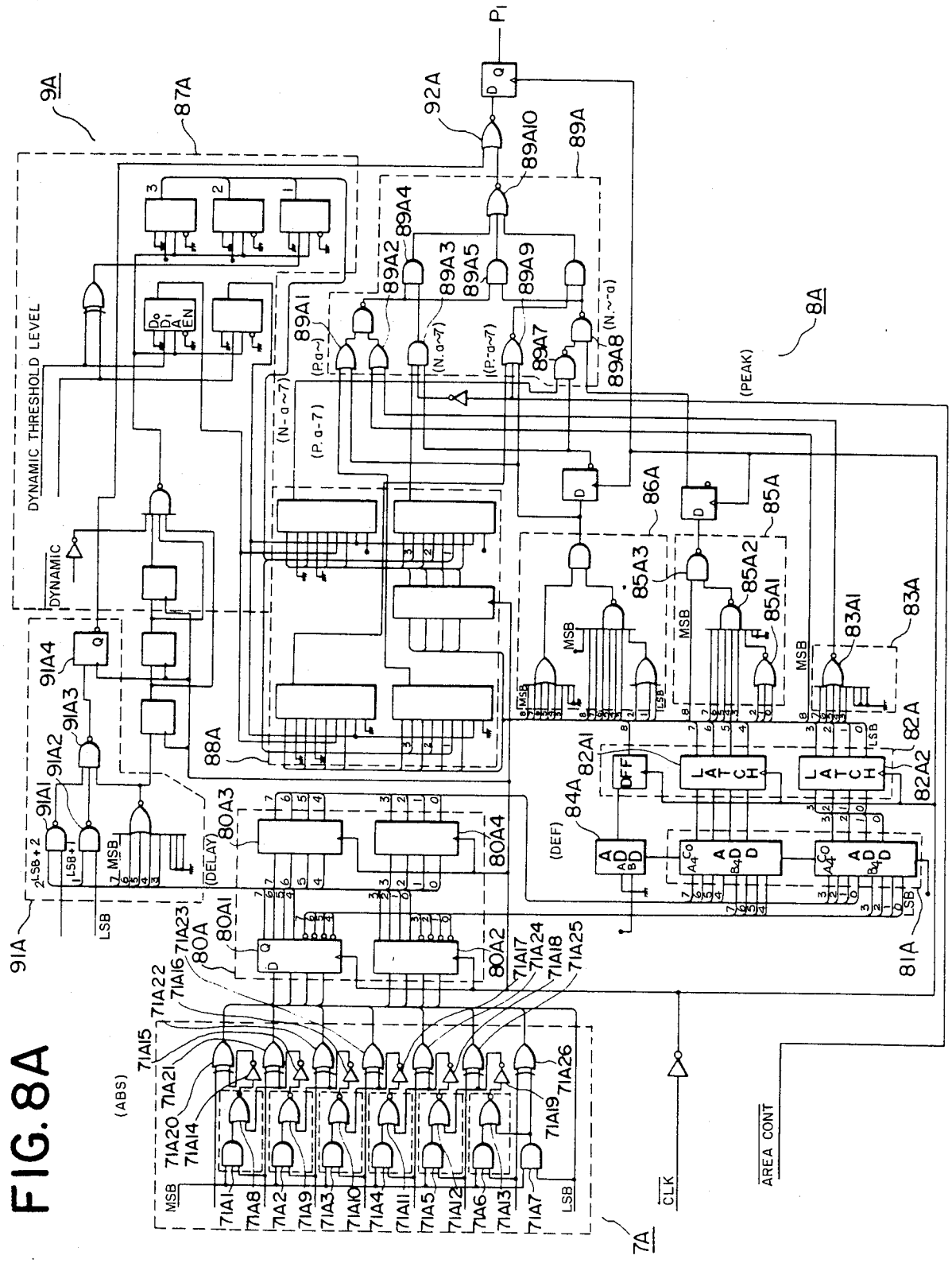
FIGS. 8A and 8B are block diagrams of absolute value circuits, peak detection circuits and noise reduction circuits used in the embodiment of FIG. 2.

In FIG. 8A, the absolute value circuit 7A comprising AND gates 7A1, 7A2, 7A3, 7A4, 7A5, 7A6, 7A7, NOR gates 7A8, 7A9, 7A10, 7A11, 7A12, 7A13, invertors 7A14, 7A15, 7A16, 7A17, 7A18, 7A19, and exclusive-OR gates 7A20, 7A21, 7A22, 7A23, 7A24, 7A25, 7A26 is supplied with the output data from the high pass filter 6A. The absolute value circuit 7A generates the absolute value of the input data thereof. A delay circuit 80A comprising latches 80A-1, 80A-2, 80A-3 and 80A-4 is supplied with the output of the absolute value circuit 7A and generates a one-sample delayed output and a further one-sample delayed output. Inverted one-sample delayed and non-inverted further one-sample delayed outputs from the delay circuit 80A are supplied to an adder circuit 81A so as to produce the difference of the inputs thereof. The output of the adder circuit 81A is one-sample delayed by a delay circuit 82A comprising latches 82A1, 82A2.

A positive edge detecting circuit 83A comprising a NOR gate 83A1 generates a detecting signal when the output of the delay circuit 82A is greater than or equal to eight. An adder 84A generates a negative detecting signal when the output of the adder 81A generates a carry signal.

A negative edge detecting circuit 85A comprising a NOR gate 85A1 and NAND gates 85A2, 85A3 is supplied with the output of the delay circuit 82A and the output of the adder 84A through the delay circuit 82A. The negative edge detecting circuit 85A generates a detecting signal when the output of the delay circuit 82A is less than or equal to minus eight.

A zone detecting circuit 86A generates a detecting signal when the output of the delay circuit 82A is between seven and minus seven.

A dynamic threshold level setting circuit 87A generates threshold level data x and y (FIG. 9B) which is set from a setting input terminal. The threshold level data is provided to a comparing circuit 88A which compares lower bits of the output of the delay circuit 82A and one-clock-delayed lower bits with the threshold level data.

Figure 9A:
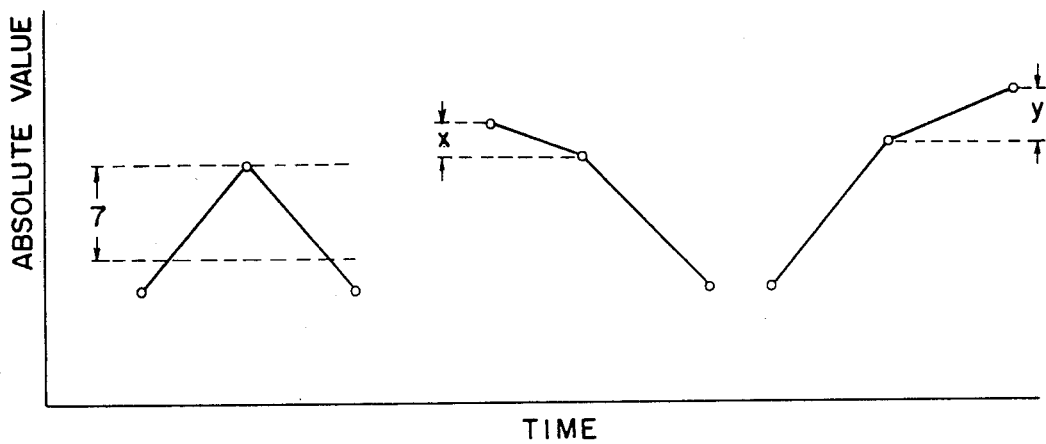
FIGS. 9A and 9B are diagrams for explaining the operation of the peak detection circuits shown in FIGS. 8A and 8B.

A peak detecting logic circuit 89A comprising OR gates 89A1, 89A2, AND gates 89A3, 89A4, 89A5, 89A6, and NAND gates 89A7, 89A8, and NOR gates 89A9, 89A10 is supplied with the positive edge detecting signal, negative edge detecting signal and zone detecting signal together with output signals from the comparing circuit 88A and generates a peak signal when a lower absolute value data is followed by a higher absolute value data and a succeeding lower absolute value data, or two higher absolute value data are followed by a lower absolute value data, or a lower absolute value data is followed by two of higher absolute value data restricted by the threshold level data as shown in FIG. 9A .

The one-clock delayed output of the delay circuit 80A is supplied to a threshold level setting circuit 91A comprising NAND gates 91A1, 91A2, 91A3 and D-type flip-flop 91A4. An output of the threshold level setting circuit 91A is supplied to a NOR gate circuit 92A as a gate signal so that the peak signal is passed through the gate circuit 92A as peak flag output $P_1$.

Figure 8B:
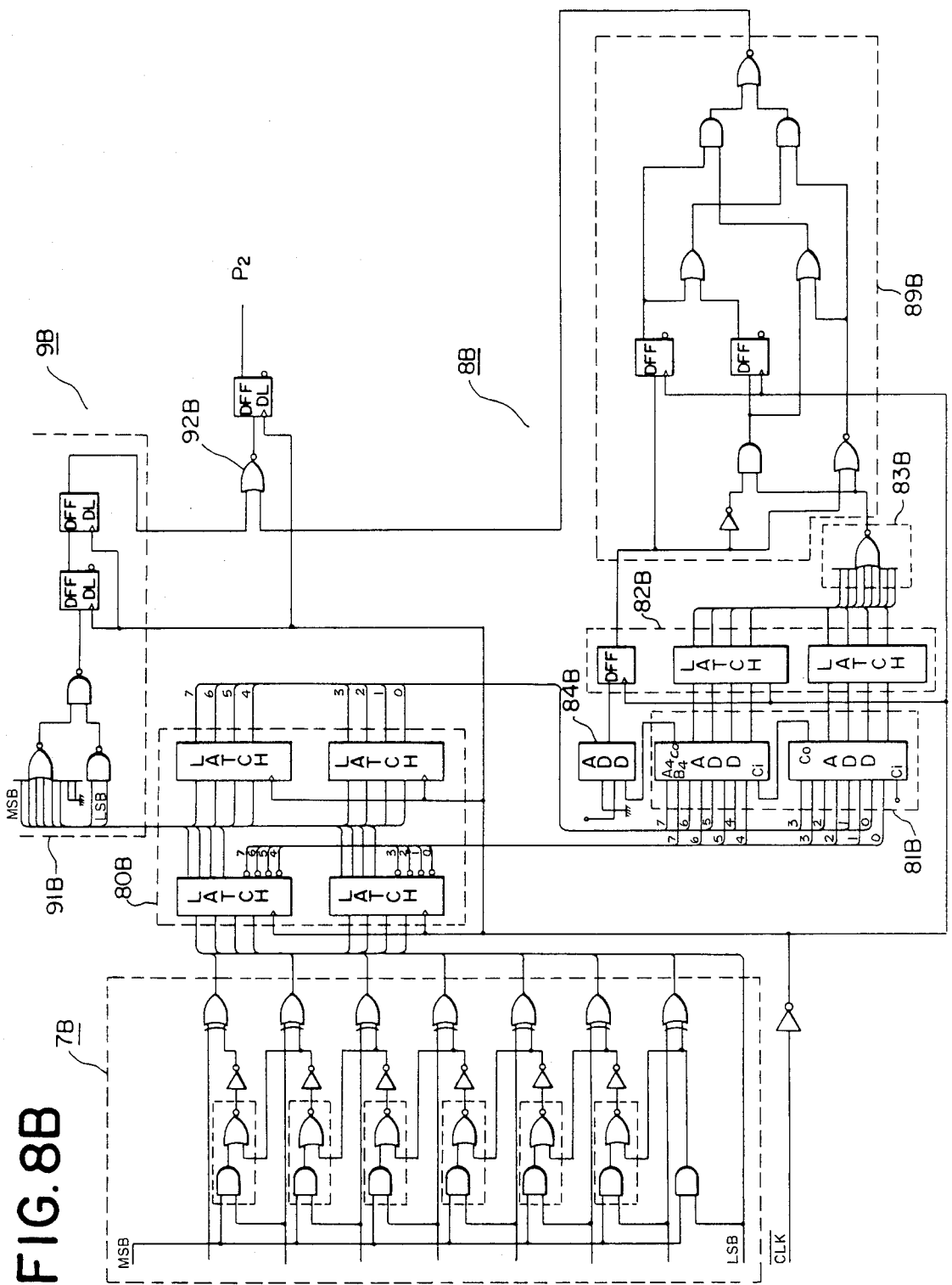

In FIG. 8B, the absolute value circuit 7B is supplied with the output data from the high pass filter 6B. The absolute value circuit 7B generates the absolute value of the input data thereof. A delay circuit 80B is supplied with the output of the absolute value circuit 7B and generates a one-sample delayed output and a further one-sample delayed output. Inverted one-sample delayed and non-inverted further one-sample delayed outputs from the delay circuit 80B are supplied to an adder circuit 81B so as to produce the difference of the inputs thereof. The output of the adder circuit 81B is one-sample delayed by a delay circuit 82B.

A positive edge detecting circuit 83B generates a detecting signal when the output of the delay circuit 82B is positive. An adder 84B generates a negative detecting signal when the output of the adder 84A generates a carry signal.

Figure 9B:
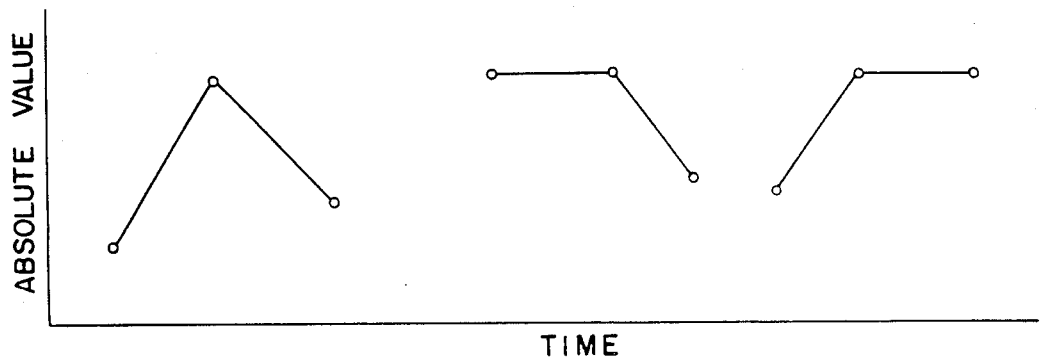

A peak detecting logic circuit 89B is supplied with positive detecting signal and one-clock delayed negative detecting signal and generates a peak signal when a lower absolute value data is followed by a higher absolute value data and a succeeding lower absolute value data, or two higher absolute value data are followed by a lower absolute value data, or a lower absolute value data is followed by two higher absolute value data, as shown in FIG. 9B.

The one-clock delayed output of the delay circuit 80B is supplied to a threshold level setting circuit 91B. An output of the threshold level setting circuit 91B is supplied to a gate circuit 92B as a gate signal so that the peak signal is passed through the gate circuit 92B as peak flag output $P_2$.

Figure 10:
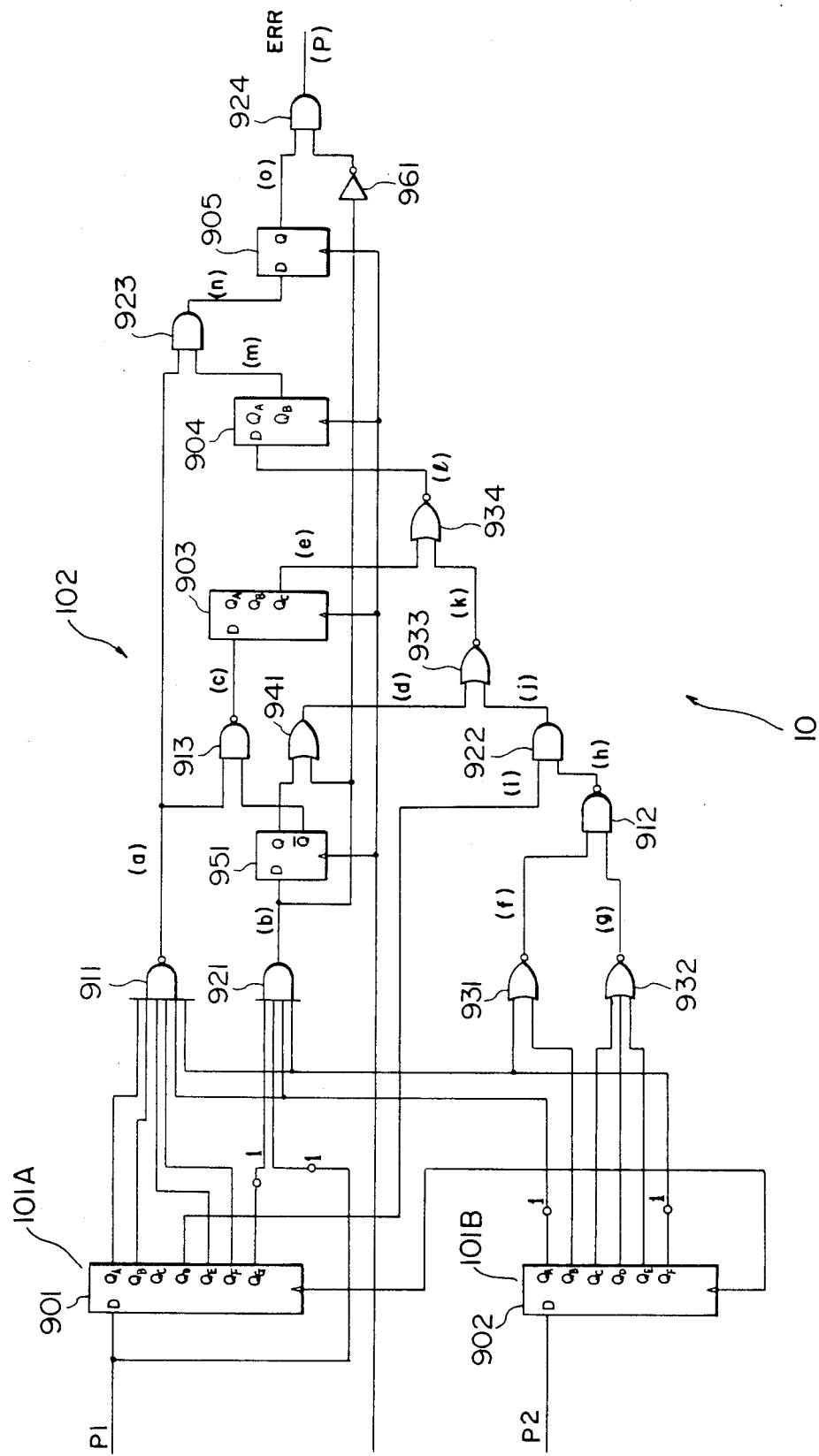
FIG. 10 is a block diagram of a pattern-recognition circuit used in the embodiment of FIG. 2.

FIG. 10 is a block diagram of a pattern-recognition circuit used in the embodiment of FIG. 2. It comprises shift registers 901, 902, 903, 904, 905, NAND gates 911, 912, 913, AND gates 921, 922, 923, 924, NOR gates 931, 932, 933, 934, and OR gates 941, a D-type flip-flop 951 and an inverter 961.

The shift register 901 has outputs $Q_A$, $Q_B$, $Q_C$, $Q_D$, $Q_E$, $Q_F$, $Q_G$, and the shift register 902 has outputs $Q_A$, $Q_B$, $Q_C$, $Q_D$, $Q_E$, $Q_F$. Inputs $P_1$ and $P_2$ are supplied to the shift registers 901 and 902, respectively, together with clock pulses CLK, and the circuit of FIG. 10 produces the output error flag P. See also FIGS. 2, 7A–7C and 11A–11C, lines (P), ($P_1$) and ($P_2$). From the relationship of the "1's" in pulse train P₁ and P₂, the number and location of errors can be deduced. This information is represented by the "1's" in the pulse train P.

Figure 11A:
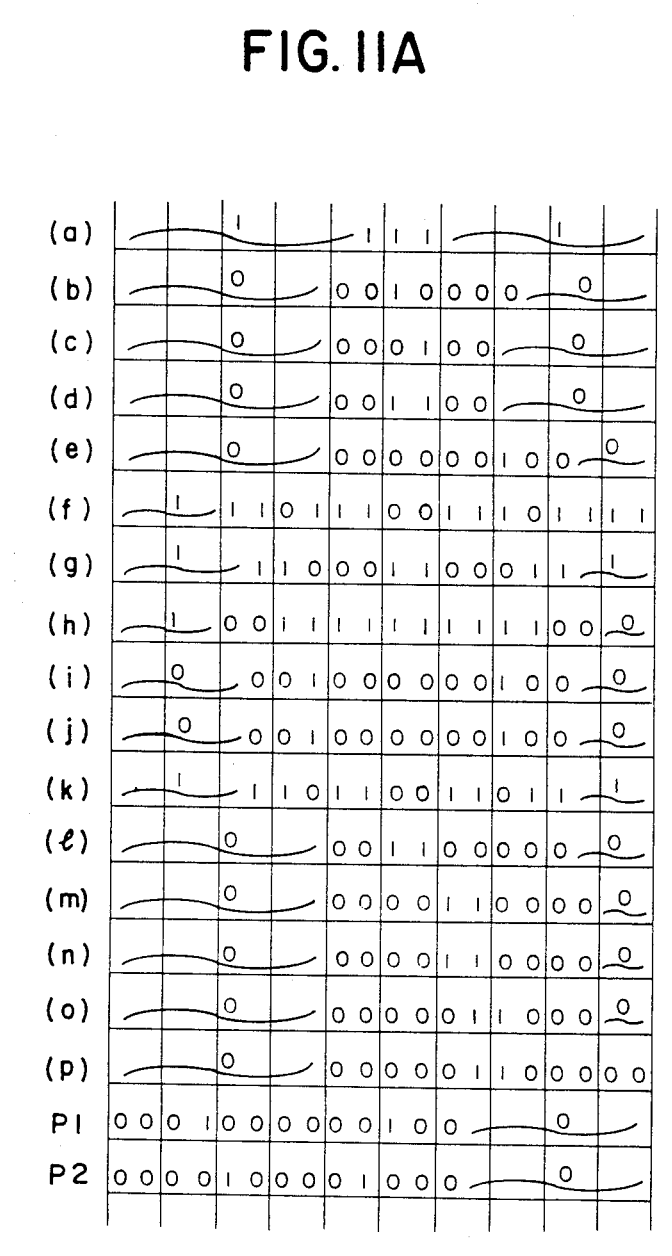
Figure 11B:
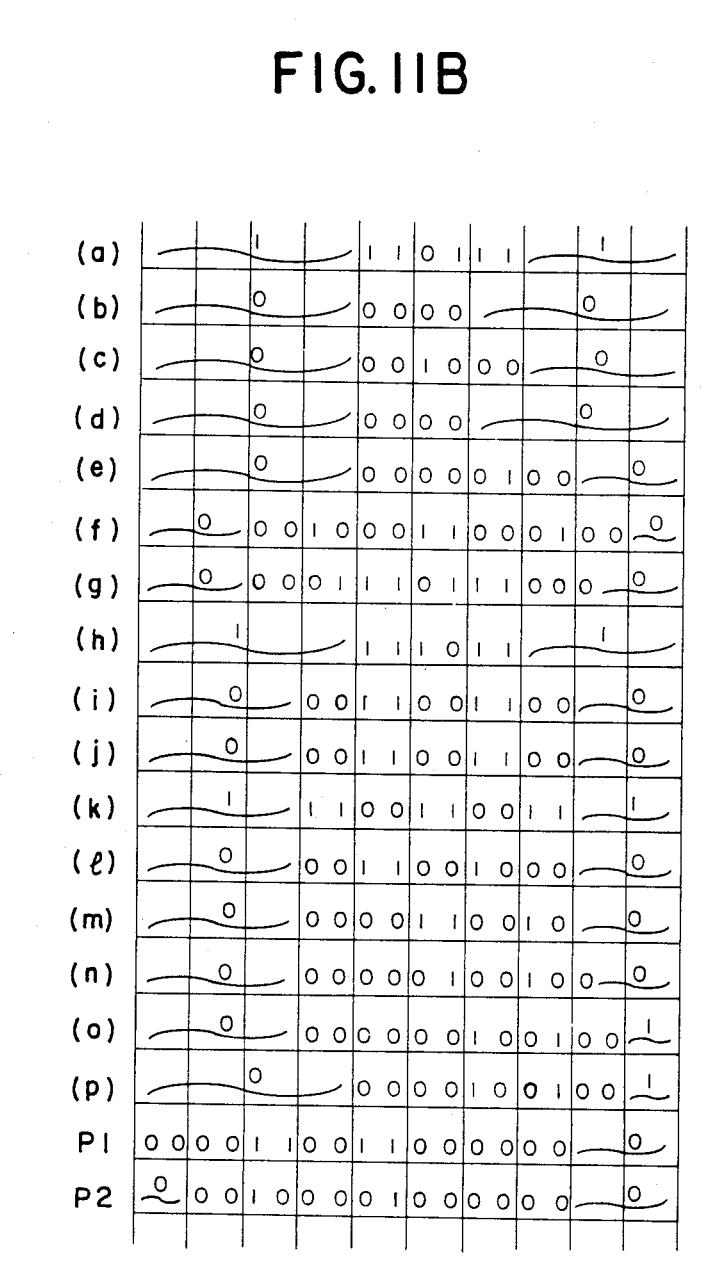

FIGS 11A–11C show pulse sequences at designated points in FIG. 10. For example, when the first seven pulses P₁ (FIG. 11A) have been clocked into the shift register 901, the outputs $Q_A$–$Q_G$ are all low except the output $Q_B$, which is high; and the output of the NAND gate 91 is high (FIG. 11A, line (a)). The status of the signals at points (b) through (o) can be similarly traced, and the results are shown in FIG. 11A, lines (b) through (o). The status of the signal clock pulse by clock pulse at point (a) in FIG. 10 is as indicated in line (a) of FIG. 11A for the inputs P₁ and P₂ shown in FIG. 11A.

FIGS. 11B and 11C show different errors (corresponding, respectively, to FIGS. 7B and 7C). For pulses P₁ and P₂ as shown at lines (P₁) and (P₂) of FIG. 11B, the status of the signals at points (a) through (o) and (P) of FIG. 10 is shown at lines (a) through (o) and (P), respectively, in FIG. 11B. Similarly, for pulses P₁ and P₂ as shown at lines (P₁) and (P₂) of FIG. 11C, the status of the signals at points (a) through (o) and (P) of FIG. 10 is as shown at lines (a) through (o) and (P) in FIG. 11C.

The circuit of FIG. 10 can be replaced by a read-only memory (ROM), as those skilled in the art will readily understand. In that case, the output of the shift registers 101A and 101B are supplied to the address terminal of the ROM as address signals and the error flag P is derived as the output data thereof.

According to the present invention, since error detection is performed through detection of the signal component lying outside the frequency band of the video signal, correct error detection can be made even in the variable speed playback mode, and the problem that error correction cannot be properly made, as in the case where the error correcting code is used, does not arise. Further, by the use of the filter outputs from the two high pass filters, it is possible to detect accurately the position of the erroneous data.

Thus there is provided in accordance with the invention a novel and highly-effective error detection circuit that requires no error correcting code and is suitable for use in a digital VTR during variable-speed playback. Many modifications of the preferred embodiment of the invention disclosed herein will readily occur to those skilled in the art. For example, the transfer functions of the band-eliminating filter 5 and high-pass filters 6A and 6B can be varied within wide limits. Accordingly, the invention is limited only by the appended claims.

What is claimed:

1. Error detection circuitry comprising:
input means for receiving a digital video signal that when free of error lies within a given frequency band and when not free of error contains components lying outside said frequency band, said components having an amplitude versus frequency distribution that is a function of the number and location of errors in said digital video signal;
detection means responsive to said input means for detecting components of said digital video signal lying outside said frequency band; and
pattern recognition means responsive to said detection means for producing an output indicative of the number and location of said errors.

2. Error detection circuitry according to claim 1; wherein said detection means comprises a first high-pass filter and a first peak detector responsive thereto, said pattern recognition means being responsive to said first peak detector.

3. Error detection circuitry according to claim 1; wherein said detection means comprises a first high-pass filter and first peak detector responsive thereto, a second high-pass filter responsive to said first high-pass filter, and a second peak detector responsive to said second high-pass filter, said pattern recognition means being jointly responsive to said first and second peak detectors.

4. Error detection circuitry according to claim 3; wherein the transfer function H(z) of each of said high-pass filters is:

$$H(z)=(-1+2z^{-1}-z^{-2})/4$$

where x is transform for sampled data, so that the transfer function of said filters together is:

$$H(z)=(-1+2z^{-1}-z^{-2})(-1+2z^{-1}-z^{-2})/16.$$

5. Error detection circuitry according to claim 3; wherein said detection means further comprises a first absolute value circuit corrected between said first high-pass filter and said first peak detector and a second absolute value circuit connected between said second high-pass filter and said second peak detector.

6. Error detection circuitry according to claim 3; wherein said detection means further comprises first and second noise reduction circuits respectively interposed between said pattern recognition means and said first and second peak detectors.

7. Error detection circuitry according to claim 6; wherein at least one of said noise reduction circuits includes means for setting a threshold level and means for gating the output of a corresponding one of said peak detectors to the extent that it exceed said threshold level.

8. Error detection circuitry according to claim 1; wherein said input means comprises a band eliminating filter.

9. Error detection circuitry according to claim 1; wherein said digital video signal is a composite color signal.

10. A method of error detection comprising the steps of:
receiving a digital video signal that when free of error has within a given frequency band and when not free of error contains components lying outside said frequency band, said components having an amplitude versus frequency distribution that is a function of the number and location of errors in said digital video signal;
detecting components of said digital video signal lying outside said frequency band; and
determining from said components the number and location of said errors.

11. A method of error detection according to claim 10 wherein said step of detecting comprises the steps of filtering said digital video signal to pass said components having a frequency higher than said given frequency band and detecting peak values of said components.

* * * * *